Figure 1:
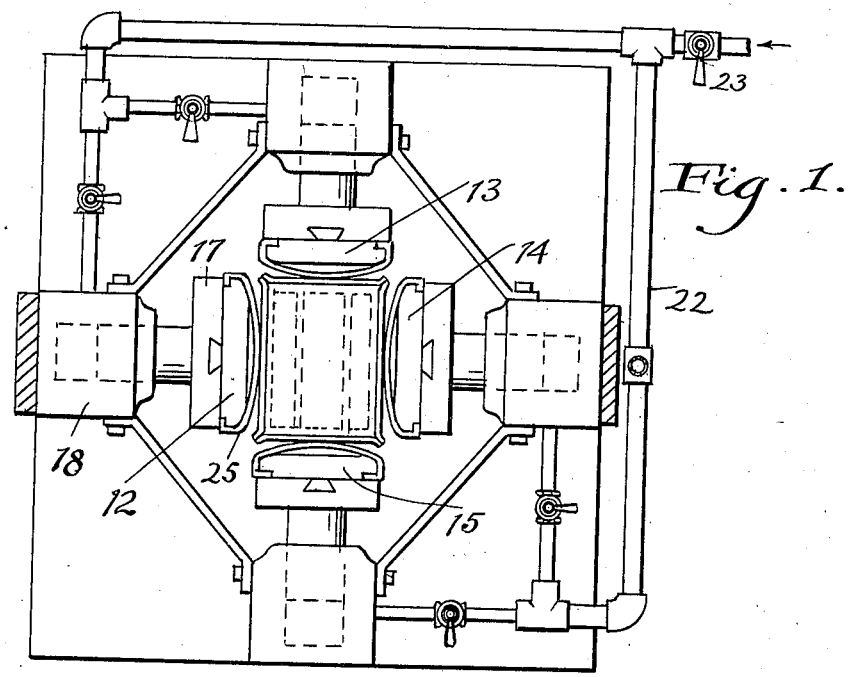

T. A. WILLARD.
METHOD OF FORMING HARD RUBBER STORAGE BATTERY JARS.
APPLICATION FILED SEPT. 12 1919.

1,352,161.

Patented Sept. 7, 1920.
2 SHEETS—SHEET 1.

Inventor
Theodore A. Willard
By Thurston Kwis & Hudson
attys.

T. A. WILLARD.
METHOD OF FORMING HARD RUBBER STORAGE BATTERY JARS.
APPLICATION FILED SEPT. 12, 1919.

1,352,161. Patented Sept. 7, 1920.
2 SHEETS—SHEET 2.

Fig. 11.

Inventor
Theodore A. Willard
By Thurston Rivers & Hudson
attys.

UNITED STATES PATENT OFFICE.

THEODORE A. WILLARD, OF CLEVELAND, OHIO.

METHOD OF FORMING HARD-RUBBER STORAGE-BATTERY JARS.

1,352,161.            Specification of Letters Patent.     Patented Sept. 7, 1920.

Original application filed August 9, 1915, Serial No. 44,375. Divided and this application filed September 12, 1919. Serial No. 323,258.

*To all whom it may concern:*

Be it known that I, THEODORE A. WILLARD, a citizen of the United States, residing at Cleveland, in the county of Cuyahoga and State of Ohio, have invented a certain new and useful Improvement in Methods of Forming Hard-Rubber Storage-Battery Jars, of which the following is a full, clear, and exact description.

This invention relates to a method of forming storage battery jars from rubber or rubber compound, and is a division of my prior application, Serial No. 44,375, filed August 9, 1915.

Hard rubber jars are usually made by wrapping calendered sheet rubber compound around metal forms and rolling the joints or seams together by hand, after which the mold with the compound on it is placed in a vulcanizer to cure and harden the rubber. This method, while it is the best which has been devised prior to my invention, is not satisfactory for numerous reasons. The joints and seams are a constant source of trouble as there is no way to determine whether or not the rubber is properly united at these points, and whether or not good jars are produced depends solely upon the skill of the maker or workman. Additionally, the process is not economical as skilled labor is required, a good quality of rubber is necessary, considerable time is required to produce a jar, and a large percentage of the jars leak because of defective joints and must be destroyed.

Other methods have been employed to some extent, but they have not gone into general use because they are too expensive and the results obtained are unsatisfactory.

The chief object of the present invention is to provide a method by which better jars can be produced and which will very materially reduce the cost of producing the jars.

In carrying out my invention I eliminate the hand rolling which heretofore has been necessary to form the jar on the mandrel and particularly to seal or close the joints, and by pressure applied directly against the several rubber covered faces of the mandrel, preferably through a suitable press, with plungers or dies disposed opposite the four sides and end of the mandrel when the latter is in the press, compress the rubber against the mandrel and at the same time effectively unite the rubber at the seams or joints. Then after the pressure is applied in this manner it is released without pulling the rubber from the core, and the forming of the jar is completed by vulcanization.

My invention may be further briefly summarized as consisting in certain novel details of construction and combinations and arrangements of parts which will be described in the specification and set forth in the appended claims.

Figure 2:
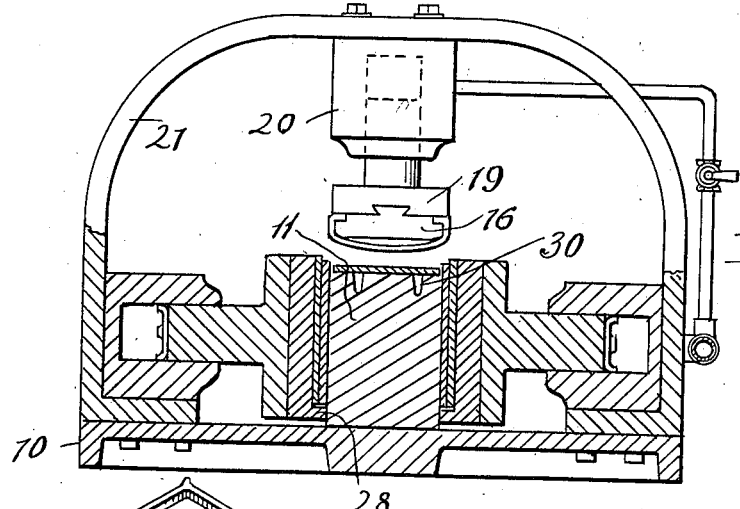
Figure 12:
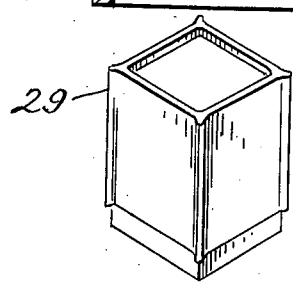
Figure 3:
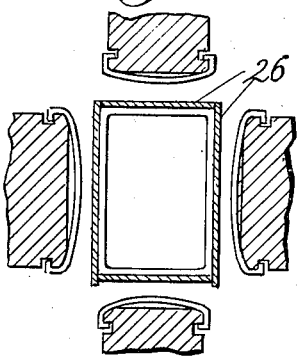
Figure 4:
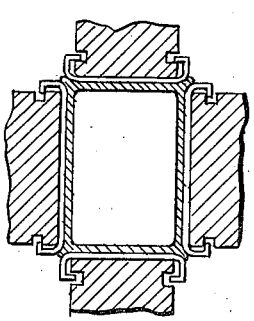
Figure 5:
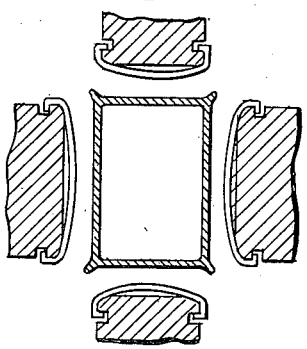
Figure 6:
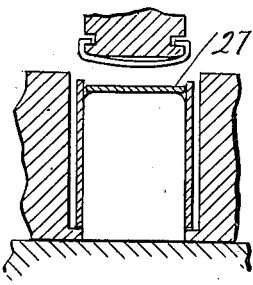
Figure 7:
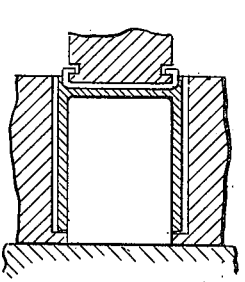
Figure 8:
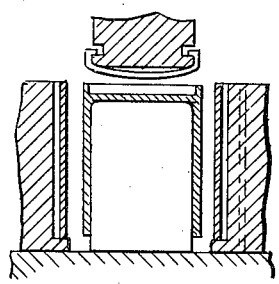
Figure 9:
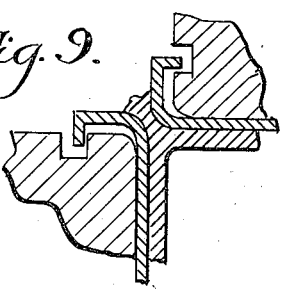
Figure 10:
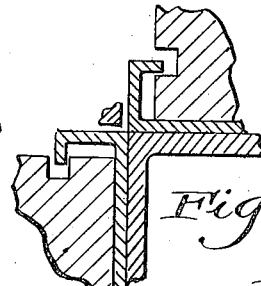

In the accompanying sheet of drawings wherein I have shown apparatus suitable for carrying out my invention, Figure 1 is a sectional plan view with the top part of the apparatus removed; Fig. 2 is a side view of the same partly in section, this view showing the sides of the jar already formed or compressed against the mandrel and the upper die about to form the bottom of the jar; Figs. 3, 4 and 5 are diagrammatic views, Fig. 3 showing the dies which form the sides of the jar about to be actuated, Fig. 4 is a similar view showing the same after they have been actuated to form the sides of the jar; Fig. 5 is a similar view showing the dies retracted; Figs. 6, 7 and 8 are diagrammatic views showing respectively the upper die which forms the bottom of the jar just before said die is actuated, after it is actuated, and after it has been retracted; Fig. 9 is an enlarged sectional view illustrating the manner in which the spring metal die faces act on the rubber compound to form the corners; Fig. 10 is a similar view showing a slight modification wherein the excess rubber compound formed in shaping the corners is trimmed off by the action of the dies; Fig. 11 is an enlarged sectional view illustrating a portion of one of the dies and of one of the spring metal die faces showing how the latter is shaped and held on the die so as to produce the results illustrated in Figs. 9 or 10; and Fig. 12 is a perspective view of the mandrel and jar formed thereon.

Referring now to the drawings, it will be seen that the jar forming machine or apparatus includes a flat horizontal bed 10 on which is placed a mandrel or form 11 which is rectangular in shape and corresponds to the internal shape of the finished jar which is to be produced. Rubber compound in the form of previously rolled and cut sheets is adapted to be squeezed onto the sides and top of the mandrel to form the sides and bottom of the jar by a plurality of dies 12, 13, 14 and 15 which operate on the mandrel to form the sides of the jar, and are located directly opposite the four sides of the mandrel, and a die 16 which with the coöperation of the mandrel forms the bottom of the jar and is arranged above the top of the mandrel. It may be stated at this point that the apparatus is susceptible of numerous modifications, particularly in the manner of actuating the dies. These dies may be moved inwardly toward the mandrel by numerous specifically different power transmitting mechanisms or media among which may be included mechanical means as well as hydraulic. Additionally, the form of the invention here shown may be further modified as it is not necessary that all the oppositely disposed dies be movable, but part may be stationary and part movable, that is to say, of the two pairs of dies operating on opposite sides of the mandrel one die of each pair might be stationary and the opposite die movable. However, I prefer to positively actuate all the dies, and I prefer also to actuate them by hydraulic rams, and this embodiment of my invention is shown in the drawing.

It will be observed that the four dies which form the sides of the jar are secured to the ends of horizontally disposed hydraulic rams or plungers 17, the outer portions of which extend in horizontally disposed hydraulic cylinders 18 mounted upon the bed 10. Likewise, the upper die 16 is carried by a hydraulic ram or plunger 19 vertically disposed and extending into a hydraulic cylinder 20 carried by any suitable framework 21 extending upwardly from the bed. Preferably these dies are all removably attached to the plungers so that they can be interchanged with dies of different sizes so as to adapt the machine for making different sizes of jars. The hydraulic cylinders will all be connected to piping 22 but which can be controlled by any number of valves 23, and which convey to the cylinders water under suitable pressure. It may be here stated that very great pressure is required to squeeze the rubber sufficiently to shape the jar and form the corners.

It is a matter of choice whether or not the dies are all operated simultaneously or whether the pairs of oppositely disposed dies which form the sides and the upper die are operated successively. I have, however, produced very good results by operating the four lower dies simultaneously and then by operating the upper die.

At their inner ends the dies are provided with spring metal die faces 25 which are normally bowed outwardly away from the end of the die, as shown in the drawings, and which extend over the edges of the die and have their edge portions fitted into slots in the sides of the dies. The spring metal die faces perform the very important functions of expelling air from between the sheets of rubber and the mandrel; of preventing the sheets being pulled away from the mandrel when the dies are retracted; and of forming the corners closing the seams or joints between the edges of the different sheets.

In operating this apparatus the rubber compound is first rolled into sheets which may be covered on one side with tinfoil if desired. This tinfoil coating is employed if it is desired that the jars have a polished finish. The sheets are then cut into squares or rectangular pieces of approximately the size of the sides and bottom of the jar which is to be formed. Then these sheets are placed adjacent the sides and end of the jar, the four sheets forming the sides of the jar being designated 26, and the sheet forming the bottom of the jar being designated 27. Then the horizontal dies are actuated or shifted inwardly compressing the rubber and forming the sides of the jar. As the dies move inwardly each of the bowed or concave spring metal faces first engages the middle of the sheet of rubber and as it is flattened it gradually engages the sheet from the middle to the side edges, forcing out all the air between the sheet and the mandrel. This is of very great importance, for if there is any air between the rubber and mandrel, during the vulcanizing process the air expands and forces the rubber out away from the form or mandrel. Additionally, the spring die faces force the surplus rubber outwardly to the edges of the sheet and form the corners of the jar, and in doing this the rubber of adjoining sheets is squeezed or pressed together and inwardly against the rounded corners of the mandrel in such a way as to eliminate seams or joints and so as to form in fact a homogeneous body at all points, the corner portions having the same consistency as any other part. After the sides of the jar are formed, the upper die is lowered with the requisite pressure so as to form the end of the jar, the action of the spring metal die face being the same as that before described, the upper sheet which forms the bottom of the jar being integrally united with the sheets forming the sides of the jar, leaving no evidence of a seam or joint.

After the jar is formed the dies are retracted and in the retraction of the dies the spring metal faces perform a third important function in that they prevent the dies pulling the compound away from the mandrel. The spring metal faces are virtually peeled off of the compound, for as the die is retracted the metal face first leaves the compound or jar at the edges of the latter, and finally leaves the jar at the middle, the spring face assuming its concave or bowed form when the die is moved away from the mandrel. The mandrel is now coated on all sides but one with plastic rubber compound, ready to be vulcanized into a hard rubber jar in the usual manner. In the construction here shown the dies may be retracted by pumping the water from the hydraulic cylinders either by a pump or suction pipe which has not been shown.

When the horizontally movable dies are forced inwardly to form or shape the sides of the jar, all four sides are made of uniform thickness, and this is brought about by gages 28, which in this case consist of projections or flanges on the lower parts of the dies, the depth or the distance which they extend outwardly from the dies being just equal or very slightly less than the thickness that is to be given to the sides of the jar. As all four of the flanges 28 at the inward stroke of the rams engage the mandrel, the thickness of the walls of the jar are very accurately gaged, and the thickness is uniform at all points. It may be stated, however, that it is unnecessary that the gages be on the dies, as they may be provided on the lower part of the mandrel, or they may be formed by a separate device or devices placed betwen the mandrel and dies.

In the construction which has been thus far described by the action of the dies, or rather by the action of the spring metal die faces, there is formed at each corner of the jar a bead or ridge of surplus rubber such as shown at 29. This either before or after vulcanization, is cut off or ground off, making the jar its proper size with square or rounded corners, as desired. If found desirable, the spring metal die faces may be utilized to completely sever the rubber at the corners, as shown in Fig. 10, forming sharp square corners. In either event, i. e., whether the excess rubber is severed as shown in Fig. 10, or simply moved outwardly and left on the corners of the jar, as shown in Fig. 9, there is formed a reinforced corner with a rounded fillet on the inner side of the jar. This is a feature which I believe has never been heretofore produced in any storage battery jar.

It may be mentioned at this point, that storage battery jars are usually provided in their bottoms with a series of rests or bridges upon which the battery plates are supported. These bridges can be formed by providing tapered slots in the upper part of the mandrel and by either inserting pieces of rubber in these slots before the upper sheet is placed on the mandrel, or by using a thick piece of compound so that a part of the latter will be forced down into the slots by the action of the die. In Fig. 2 these rests or bridges are shown at 30.

With the method above described, very good jars can be produced quite inexpensively, particularly as there is practically no loss, the jars being formed uniformly good, particularly at the corners, as the sheets of compound which are employed to form the jar are almost perfectly united or joined together at their edges or at the corners of the jar, leaving no evidence of a seam or joint. Additionally, the jars can be formed rapidly, and skilled labor is not required as is required with the prior hand method. I have found also that jars just as effective and efficient as those produced with hand methods could be produced with this apparatus, using a less expensive rubber compound than that which was required heretofore. I am therefore enabled with the apparatus to produce jars which are as good or better than those produced heretofore, and which cost considerably less. Further advantages which might be mentioned are that the jars are of uniform size inside and out, and they may be made of any grade of compound which can be vulcanized into hard rubber. Additionally, with this method the rubber does not flow and the grain of the rubber is not disturbed, this together with the fact that the jars are provided with the fillet corner reinforcement and because the compound is compressed with very heavy pressure cause the jars to be exceedingly strong and durable.

Having described my invention, I claim:

1. The method of forming hard rubber storage battery jars which comprises placing uncured rubber in sheet form around the sides and over the end of a mandrel, applying pressure simultaneously and uniformly over all parts of each rubber covered face of the mandrel, relieving the pressure, and then vulcanizing the jar on the mandrel.

2. The method of forming hard rubber storage battery jars which comprises placing plastic uncured rubber in sheet form over the sides and end of a mandrel, applying pressure so as to simultaneously press the rubber against the sides and end of the mandrel and close all joints, then removing the pressure and vulcanizing the jar on the mandrel to cure and harden it.

3. The method of forming hard rubber storage battery jars which comprises placing plastic uncured rubber in sheet form over the sides and end of a mandrel, applying pressure entirely over each rubber covered face of the mandrel in a direction at right angles thereto so as to cause all the rubber to be simultaneously pressed against the mandrel and the joints to be sealed or closed, removing the pressure so that the jar may be cured and hardened by vulcanization.

4. The method of forming hard rubber storage battery jars which comprises placing uncured rubber in sheet form over the sides and end of a mandrel, applying pressure so as to simultaneously squeeze the rubber firmly against the several faces of the mandrel and to squeeze together the rubber at the seams or joints, the pressure being applied in such a way as to work the air out from beneath the sheet rubber and mandrel, then relieving the pressure so that the jar may be cured and hardened by vulcanization.

5. The method of forming hard rubber storage battery jars which comprises placing plastic uncured rubber in sheet form over the sides and end of a mandrel, applying pressure at right angles to the rubber covered faces of the mandrel, so that all the rubber applied thereto will be simultaneously squeezed against the mandrel and effectively pressed together at the seams or joints, and then relieving the pressure without pulling the rubber from the mandrel.

6. The method of forming hard rubber storage battery jars which comprises placing uncured plastic rubber in sheet form over the sides and end of a mandrel, and by pressure applied at right angles to the faces of the mandrel squeezing the rubber against the mandrel so as to form a tight rectangular jar with reinforcing fillets at its corners.

7. The method of forming hard rubber storage battery jars which comprises placing uncured plastic rubber in sheet form over the sides and end of a mandrel, and by pressure applied at right angles to the faces of the mandrel squeezing the rubber against the mandrel so as to form a tight rectangular jar having on the inner sides reinforcing corner fillets.

In testimony whereof, I hereunto affix my signature.

THEODORE A. WILLARD.